(12) United States Patent
Blume

(10) Patent No.: US 12,204,123 B1
(45) Date of Patent: Jan. 21, 2025

(54) TINT FILM AND ASSOCIATED METHODS

(71) Applicant: Brandon L. Blume, Pittsburgh, PA (US)

(72) Inventor: Brandon L. Blume, Pittsburgh, PA (US)

(*) Notice: Subject to any disclaimer, the term of this patent is extended or adjusted under 35 U.S.C. 154(b) by 4 days.

(21) Appl. No.: 17/892,421

(22) Filed: Aug. 22, 2022

Related U.S. Application Data

(63) Continuation of application No. 16/377,638, filed on Apr. 8, 2019, now Pat. No. 11,454,750.

(51) Int. Cl.
*G02B 5/22* (2006.01)
*B32B 27/30* (2006.01)
(Continued)

(52) U.S. Cl.
CPC ............ *G02B 5/223* (2013.01); *B32B 27/304* (2013.01); *B32B 37/12* (2013.01); *B32B 38/10* (2013.01); *B32B 38/14* (2013.01); *B32B 38/145* (2013.01); *B60Q 1/04* (2013.01); *C09J 7/245* (2018.01); *C09J 7/38* (2018.01); *C09J 7/40* (2018.01); *G02B 1/10* (2013.01); *G02B 7/023* (2013.01); *B32B 2037/268* (2013.01); *B32B 2307/412* (2013.01); *B32B 2323/04* (2013.01); *B32B 2327/06* (2013.01); *B32B 2375/00* (2013.01); *C09J 2301/16* (2020.08); *Y10T 428/1467* (2015.01); *Y10T 428/1476* (2015.01)

(58) Field of Classification Search
CPC ... B32B 27/304; B32B 37/12; B32B 2255/10; B32B 2255/12; B32B 2255/26; B32B 2274/00; B32B 2307/4023; B32B 2307/412; B32B 2307/748; B32B 2307/762; B32B 2551/00; B32B 2605/006; B32B 27/08; B32B 27/10; B32B 27/306; B32B 27/308; B32B 27/322; B32B 27/40; B32B 29/00; B32B 3/30; B32B 7/06; B32B 7/12; B32B 9/005; B32B 9/045; Y10T 428/1467; Y10T 428/1476; G02B 1/10; G02B 5/223; G02B 7/023; F21S 41/28; F21S 43/26; F21S 45/10; C09J 7/245; C09J 7/38; C09J 7/40; C09J 2301/122; C09J 2301/312; C09J 2427/006; C09J 2475/006; C09J 7/29; C09J 7/30; C09J 2301/16; B60Q 1/04; B60Q 1/0005
See application file for complete search history.

(56) References Cited

U.S. PATENT DOCUMENTS 8,233,188 B2   7/2012  Nashimoto
11,454,750 B1*  9/2022  Blume .................. C09J 7/38
(Continued)

*Primary Examiner* — Sonya M Sengupta
(74) *Attorney, Agent, or Firm* — Timothy A. Hodgkiss; Buckingham, Doolittle & Burroughs, LLC

(57) ABSTRACT

A tint film for application to a target surface, such as a headlight, includes a release liner, an adhesive layer, an at least partially transparent cast layer, and a tint layer. The tint layer is provided as an at least partially light-transparent layer, which may be printed upon the at least partially transparent layer using an ink-jet printing process. In addition, the adhesive layer is configured to have low-tack, so as to facilitate the ease in which the tint film is applied. In some cases, the at least partially transparent layer and the at least partially light-transparent tint layer may be formed together as a composite layer in a casting process.

12 Claims, 6 Drawing Sheets

(51) Int. Cl.
    *B32B 37/12*     (2006.01)
    *B32B 37/26*     (2006.01)
    *B32B 38/00*     (2006.01)
    *B32B 38/10*     (2006.01)
    *B32B 38/14*     (2006.01)
    *B60Q 1/04*     (2006.01)
    *C09J 7/24*     (2018.01)
    *C09J 7/38*     (2018.01)
    *C09J 7/40*     (2018.01)
    *G02B 1/10*     (2015.01)
    *G02B 7/02*     (2021.01)

(56) References Cited

U.S. PATENT DOCUMENTS

| | | |
|---|---|---|
| 2003/0076582 A1 | 4/2003 | Phillips |
| 2006/0083894 A1 | 4/2006 | Vetrovec |
| 2007/0166501 A1 | 7/2007 | Seitz |
| 2012/0043015 A1 | 2/2012 | Feller |
| 2013/0199950 A1 | 8/2013 | Feller |
| 2016/0089858 A1 | 3/2016 | Swanson |
| 2019/0064407 A1 | 2/2019 | Krogman |
| 2020/0109315 A1 | 4/2020 | Schurman |

\* cited by examiner

TINT FILM AND ASSOCIATED METHODS

CROSS-REFERENCE TO RELATED APPLICATION

This application is a continuation of U.S. patent application Ser. No. 16/377,638 filed Apr. 8, 2019, the contents of which are incorporated herein by reference.

TECHNICAL FIELD

The various embodiments disclosed herein are directed toward tint films and methods of making and utilizing the same. In particular, the various embodiments disclosed herein are directed to tint films suitable for application to target substrates, such as vehicle headlight lenses.

BACKGROUND

Many individuals seek to customize their vehicles to enhance their aesthetic appearance, and to attract more attention. Customization may be achieved, in some cases, by applying a colorized film over various portions of the exterior body of the vehicle, including various light assemblies provided thereby. For example, these colorized films may be placed over the transparent lens of the light assembly to change the visual appearance of the light assembly itself, and/or to change the color of the light that is emitted by the light assembly. In addition, these films may offer certain protection to the light assemblies from various airborne road hazards, including rocks, dirt and other debris. Such films may also prevent discoloration and deterioration of the lens portion of the light assembly and may also protect various operating components that are shielded under the film, such as various electronics, from the damaging effects of the sun.

However, existing tint films used for application to vehicle light assemblies, particularly headlights, suffer from one or more disadvantages, including being thick, stiff, non-conformable, and difficult to apply. In addition, due to the medium to high tack adhesive of these current films, they have non-existent to minimal slideability or glideability, making installation of such films extremely difficult even for a highly skilled professional installer. This typically results in an unsatisfactory installation of the tint film, which detracts from the enhanced visual appeal that was originally intended from the installation of the tint film. Furthermore, the permanent adhesives used by current tint films can have damaging effects to the substrate, such as the headlight lens, when removed. In addition, current tint films are prone to increased deterioration from environmental elements due to the lack of a UV (ultra-violet) resistant topcoat on the film. Furthermore, such tint films suffer from inconsistent shading/coloring that results from the use of low-quality manufacturing techniques, which use inferior pigments and/or dyes.

Thus, there is a need in the art for an improved tint film.

SUMMARY

One or more embodiments disclosed herein provide a method of manufacturing a film for applying tint to a target component comprising providing a film including an at least partially transparent cast layer having a top surface and a bottom surface; an adhesive layer in adhesive contact with the bottom surface of the transparent layer, the adhesive layer having a tack of less than 400 gm/cm$^2$; and a release liner in releasable adhesive contact with the adhesive layer on a surface of the adhesive layer opposite the transparent layer; and applying a tint layer on the top surface of the at least partially transparent layer, wherein the tint layer is at least partially light transparent.

Other embodiments disclosed herein provide a method of manufacturing a cast tint film comprising providing a release liner; treating the release liner with a low tack adhesive mixture of less than 400 gm/cm$^2$ to form an adhesive layer; applying a composite mixture of at least partially transparent material and tint material onto the adhesive layer; and heating the composite mixture to form a cast tint layer that is at least partially light transparent.

Still other embodiments disclosed herein relate to a tint film comprising an at least partially transparent layer having a top surface and a bottom surface; an adhesive layer in adhesive contact with the bottom surface of the transparent layer, wherein the adhesive layer has a tack of less than 400 gm/cm; a release liner in releasable adhesive contact with the adhesive layer at a surface of adhesive layer opposite the transparent layer; and a tint layer disposed on the at least partially transparent layer, the tint layer being at least partially light transparent.

BRIEF DESCRIPTION OF THE DRAWINGS

The various embodiments disclosed herein will become better understood with regard to the following description, appended claims, and accompanying drawings wherein:

DETAILED DESCRIPTION

With reference to the FIGS., one or more embodiments of a tint film 10 are shown, which may be applied to a target component 11, such as a lens portion of various light assemblies, such as those provided by a vehicle. It should be appreciated that the lens includes the portion of the light assembly through which light emitted by a light source passes before reaching the external environment. Such lenses may be formed of any suitable material, such as plastic, glass, and the like, and may be transparent or at least partially transparent. Furthermore, while the following discussion relates to the use of the film 10 for application to the lens of a vehicle headlight, such should not be construed as limiting, as the film 10 may be applied to any lens associated with a lighting assembly, including but not limited to: marker lights, parking lights, fog lights, brake lights, turn signal lights, emergency, reverse lights, and the like. It should be appreciated that such light assemblies may include those provided by any on-road or off-road vehicle, including but not limited to cars, trucks, SUVs, boats, all-terrain vehicles, and the like. It should also be appreciated that the film 10 may be used with any light assemblies regardless of whether they are provided as a part of a vehicle. Furthermore, while some of the discussion presented herein relates to the use of the film 10 on target components, such as vehicle headlights, the film 10 may be used on any target component 11, including but not limited to interior or exterior substrates or surfaces, trims, wheels, interior components, painted and non-painted surfaces, metal surfaces, plastic-based surfaces, and the like.

Figure 1:
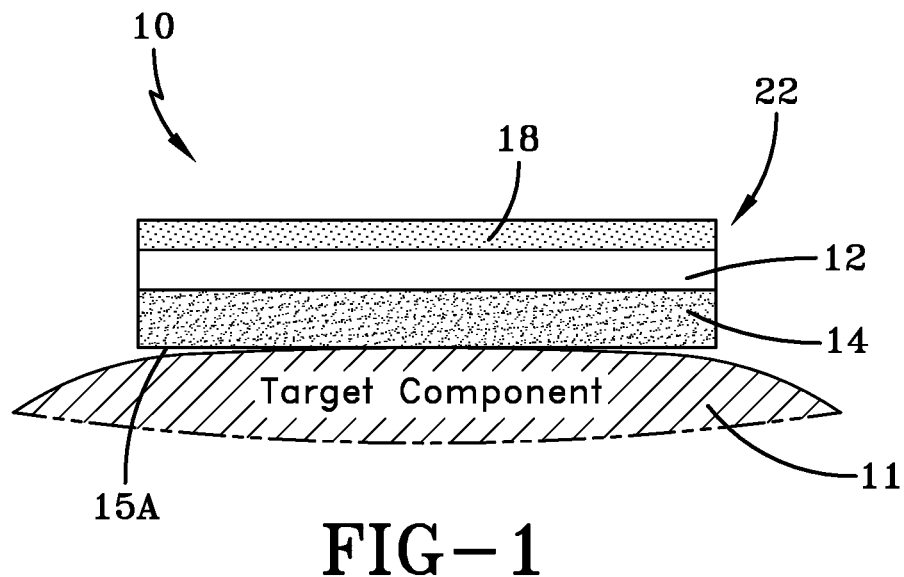
FIG. 1 is a cross-sectional view of a tint film applied on a target component, such as a vehicle light assembly lens in accordance with the various embodiments disclosed herein.
Figure 2:
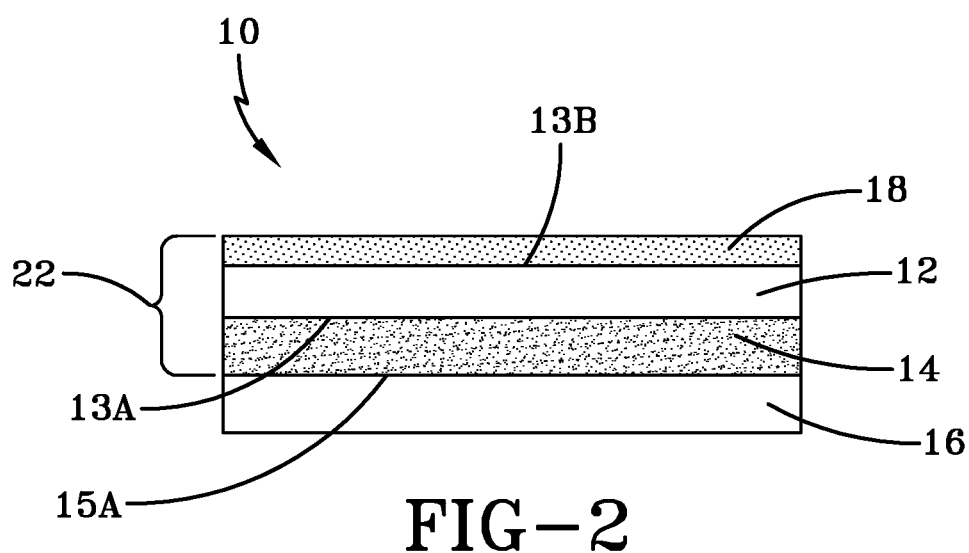
FIG. 2 is a cross-sectional view of the tint film including a release liner in accordance with the various embodiments disclosed herein.

The tint film 10, as shown in FIGS. 1 and 2, which may also be referred to as a cover or a wrap, includes a transparent layer 12 having opposed surfaces 13A and 13B. Surface 13A of transparent layer 12, which may also be referred to as a facestock layer, cast layer, printed layer, or design-receptive layer, is in adhesive contact with an at least partially light-transparent adhesive layer 14. In some cases, the adhesive layer 14 is pressure-sensitive or pressure-activated. Disposed on surface 13B of transparent layer 12 is a tint layer 18, which may also be referred to as a printed layer, and is at least partially light-transparent. Thus, the adhesive layer 14 and the tint layer 18 are at least partially transparent to light and, therefore, are not completely opaque or completely light-blocking. In particular, the tint layer 18 allows some portion of the light that is received through the adhesive layer 14 from the light source associated with the target component 11, such as a headlight, to pass through the tint layer 18 and out of the film 10 into the external environment. Thus, the tint layer 18 serves to process the light delivered from the light source originally provided by the target component 11, such that the light passing out of the tint layer 18 and into the external environment is modified or altered in some manner. This modification or alteration may include, but is not limited to a change in tint, color saturation, brightness, color intensity, color hue, tone, and color temperature, as well as any combination thereof. In one or more embodiments, which will be discussed further below, the tint layer 18 may form a portion of, or be combined with, transparent layer 12 to form a composite layer rather than being formed as a separate distinct layer. Whether tint layer 18 forms a portion of the transparent layer 12 or forms a distinct layer, tint layer 18 and transparent layer 12 may together be referred to as a top layer of tint film 10.

The tint film 10 may also optionally include a release liner 16 that is in adhesive releasable contact with surface 15A of adhesive layer 14 opposite the transparent layer 12, as shown in FIG. 2.

It should also be appreciated that the various layers of the tint film 10 are arranged adjacent to each other, but in other embodiments, tint film 10 may be configured to include one or more other layers positioned between any of the transport layer 12, adhesive layer 14, the release liner 16, and the tint layer 18.

Tint film 10 may be prepared by a variety of methods. For example, in certain embodiments, adhesive layer 14 is applied directly onto transparent layer 12 and then release liner 16 is applied to adhesive layer 14. In other embodiments, adhesive layer 14 may be applied directly onto release liner 16 and then transparent layer 12 is applied to adhesive layer 14. In certain embodiments, adhesive layer 14 is applied as a precursor composition that is then formed into an adhesive for the adhesive layer 14, such as by heating, baking, seeded emulsion polymerization, microemulsion polymerization, cooling, crosslinking, and/or curing to build sufficient adhesive strength. In one or more embodiments, adhesive layer 14 may first be applied to an intermediate material, such as a release coated roller or intermediate liner, and then transferred to the transport layer 12 or a release liner 16. It should be appreciated that the transparent layer 12, adhesive layer 14, and release liner 16 may form a film through a casting process prior to the printing of the tint layer upon the transparent layer.

It should also be appreciated that release liner 16 may be left in contact with adhesive layer 14 while tint film 10 is being packaged and shipped to an end user. When film 10 is placed into use, the release liner 16 is removed from adhesive layer 14, leaving the transparent layer 12, adhesive layer 14, and tint layer 18, the combination of which is referred to as a target tint film 22. However, it should be appreciated that the term "tint film", as used herein, may refer, depending on the context of the discussion, to either the target tint film 22 that does not include the release liner 16 or to the tint film 10 that does include the release liner 16. Target tint film 22 is configured to be applied to a target component, object, or substrate 11 by applying the surface 15A of the adhesive layer 14 of the film 10 thereto. In other embodiments, the tint layer 18 and the transparent layer 12 may be combined as a composite layer in a manner to be discussed.

L. Tint Film:

A. Transparent Layer:

In one or more embodiments, transparent layer 12 may comprise an at least partially light-transparent material, such as a polymeric material, which may comprise polyvinylchloride (PVC), polyurethanes, thermoplastic urethanes (TPU), polyolefin, acrylic, co-polymers, amorphous saturated polyesters, amorphous sulfonated polyesters, polyurethanes, propylene polymers, vinyl acetate-containing polymers, and the like, and combinations thereof. The thermoplastic urethanes may be polyester-based, mainly derived from adipic acid esters, or polyether-based TPUs, based on tetrahydrofuran (THF) ethers. The polymeric materials may be extruded or cast to form the polymeric transparent layer 12. In certain preferred embodiments, the transparent layer 12 is a cast material, formed by a casting process, which may include, but is not limited to cast polyvinylchloride (PVC) for example.

In one or more embodiments, the polymeric transparent layer 12 may include additives that are incorporated with the polymeric material. Exemplary additives include but are not limited to: plasticizers, antioxidants, pigment, dye, surfactant, dispersant, wetting agent, plasticizer, defoamer, coupling agent, UV absorbent, UV stabilizers, terpene hydrocarbon resin, and the like. In one or more embodiments, the plasticizer may comprise a high-boiling solvent or softening agent, for example.

Transparent layer 12 may be fabricated by any suitable method. In one or more embodiments, where transparent layer 12 is a cast polyvinylchloride (PVC) layer, transparent layer 12 may be made by first preparing PVC plastisols and/or organosols. Non-porous or semi-porous resin, such as micro-suspension or emulsion resin, may be used for the plastisol or organosol preparation. The resin particles may be wetted with plasticizer molecules to become a PVC suspended liquid. The plastisols and/or organosols may be coated on a polyester or paper web, which is relatively heat resistant. Then, the coated web may be cured in an oven to achieve the cast PVC layer. This heating step includes a transition sequence of plastisols and/or organosols, to pre-gelation, to gelation, and then to fusion. The heating step may utilize a plurality of ovens. In certain embodiments, the liquid plastisols and/or organosols are converted into pre-gelation at about 135° F., then to complete gel at about 180° F., and then fusion at about 280° F. The final cast transparent film layer 12 product is then sufficiently cooled in order to solidify the cast film layer 12.

The opacity of the transparent layer 12 may be characterized by a visible light-transmittance (VLT) performance metric, which identifies the amount of light permitted to pass through the transparent layer 12. In one or more embodiments, transparent layer 12 may have a VLT from about 5% to about 90% and in other embodiments, from about 15% to about 55%, so as to be at least partially light transparent. In some embodiments, the VLT of the transparent layer 12 may be nearly 100%, so as to be effectively transparent.

The thickness of transparent layer 12 may be in a range of from about 0.5 mil to about 8.0 mil and in other embodiments, from about 2.0 mil to about 4.5 mil. The thickness of transparent layer 12, and the various other layers described herein, may be defined by the ISO 534 standard.

B. Adhesive Layer:

In one or more embodiments, adhesive layer 14 is formed of a material that is an at least partially light-transparent, low-tack, pressure-sensitive adhesive. In some embodiments, the adhesive layer 14 is solvent-based. It should be appreciated that adhesive layer 14 is configured as a dry adhesive.

Suitable materials for adhesive layer 14 include but are not limited to: solvent acrylic; solvent polyacrylate; acrylic polymers; emulsion polymers; polyvinyl acetate, both permanent and removable; ethylene vinyl acetate; and the like.

As used herein, the term "low-tack" is defined as having a tack of less than 400 $gm/cm^2$. In one or more embodiments, adhesive layer 14 may have a low tack of 300 $gm/cm^2$ or less, 200 $gm/cm^2$ or less, or 100 $gm/cm^2$ or less. In other embodiments, adhesive layer 14 may have a tack from about 50 $gm/cm^2$ to about 400 $gm/cm^2$ and in other embodiments, from about 80 $gm/cm^2$ to about 300 $gm/cm^2$. In one or more embodiments, adhesive layer 14 has a tack of about 270 $gm/cm^2$ or approximate thereto or less. In other embodiments, adhesive layer 14 has a tack of 300 $gm/cm^2$ to 50 $gm/cm^2$, or from 250 $gm/cm^2$ to 100 $gm/cm^2$, or from 200 $gm/cm^2$ to 150 $gm/cm^2$ for example. As generally known to the skilled person, the tack of an adhesive generally refers to how quickly an adhesive bond is formed. The tack may be measured using ASTM D 2979 standards. The low tack of adhesive layer 14, which may also be referred to as a target component contact system, allows the adhesive layer to have increased slideability as compared to current tint films when applying adhesive layer 14 to the target component 11. This slideability, which will be discussed in detail below, allows effortless repositioning of adhesive layer 14 until a desirable position of the film 10 is obtained on the target component 11. This is advantageous because the target tint film 22 can be easily slid into place before becoming permanently affixed, rather than needing to be removed and reapplied.

In these or other embodiments, adhesive layer 14 includes a plurality of interconnected air channels 50 that extend to the edge of the film, as shown in FIGS. 8-12, which allow the release of air upon application to a target component 11. These air-egress channels 50 create a network of interconnected channels or grooves in the adhesive layer 14 of the film 10 and function as escape routes for entrapped air. For example, as an installer squeegees the film 10, the air trapped between the film 10 and the target object 11 is directed through the air channels to the edge of the film 10. The release of air, upon applying adhesive layer 14 to a target component and/or squeegeeing the film, may be characterized as having no visible air bubbles. The thickness of adhesive layer 14 may be in a range from about 10 microns to about 200 microns and in other embodiments, from about 30 microns to 150 microns. These air channels 50 may also be referred to as micro-structured, low-profile, air-egress channels.

In some embodiments, the release liner 16 includes ridges or other protrusions, which form the plurality of interconnected air channels 50 in the adhesive layer 14 when the release liner 16 is removed therefrom.

The width of the air channels 50 reduces the surface area that the adhesive layer 14 is able to have in contact with the surface of the target component 11 and, therefore, allows the tint film 10 to be slid with minimal effort, so as to be positioned as desired relative to the target component 11. Pressure is applied to the adhesive layer 14 to start the adhesive curing process. Once pressure is applied, heat may be used to expedite the curing process to cause the adhesive layer 14 to flow. As a result, the air channels 50 progressively deform, as shown in FIGS. 8-12. The deformation of the air channels 50 permits more surface area of the adhesive layer 14 to come into contact with the surface of the target component 11. Finally, as time progresses and pressure is applied, the air channels 50 are completely or nearly completely deformed or eroded by the "flowing" adhesive layer 14, such that they do not serve to function as air channels, thus allowing the adhesive layer 14 to have maximum surface area contact with the target component 11. As time elapses and/or post-heating techniques are applied, adhesive layer 14 is made permanent. In one or more embodiments, the adhesive layer 14 achieves a final bond strength of from about 4.0 lbs/in to about 6.0 lbs/in and in other embodiments, achieves a final bond strength of from about 2.0 lbs/in to about 8.0 lbs/in. Simultaneously with this process, any air trapped between the film 50 and target component 11 is able to be routed out through the interconnected air channels 50 to the edge of the film 10 and into the external environment.

C. Release Liner:

Release liner 16 generally includes a release liner substrate and a release agent applied on the release liner substrate. In one or more embodiments, the release agent layer may be embossed with a textured pattern, as previously discussed, which provides the above-described air channels 50 in adhesive layer 14. The release agent may be applied on one side or both sides of the release liner substrate. The release liner substrate serves as a receiving material for the release agent and protects adhesive layer 14. As mentioned elsewhere herein, release liner 16 is removed from adhesive layer 14, whereupon the adhesive layer 14 of the target tint film 22 is applied to the vehicle 11.

Suitable materials for the release liner substrate include, but are not limited to: paper, such as Kraft paper, polyethylene-coated paper, poly-coated paper, or clay-coated paper; polyester; unprimed polyester; HDPE; polypropylene; biaxially-oriented polypropylene; cast polypropylene; high-density polyethylene; low-density polyethylene; and glassine.

Furthermore, suitable materials comprising the release agent include, but are not limited to silicone, fluorosilicone, fluoropolymer, silicone hydride siloxanes, reactive silicone polymer agents, and non-silicone polymer agents. The release agent may utilize solvents or may be solvent-less. In some embodiments, the release agent may utilize an emulsion system.

Release liner 16, particularly the release agent thereof, may be configured to have a low-release force. In one or more embodiments, the low-release force may be characterized as from about 2 g/cm to about 10 g/cm when tested by TLMI release range testing @ 90 degrees (760 cm/min). In certain embodiments, the low-release force may be characterized as 4.8 g/cm, or approximate thereto, when tested by TLMI release range testing @ 90 degrees (760 cm/min).

The low release force, based on the utilization of the above release agents, reduces static electricity build-up upon removal of release liner 16. This reduction in static electricity build-up prevents contaminants or debris from being attracted to adhesive layer 14 upon removal of release liner 16. The thickness of release liner 16 may be in a range of from 50 $g/m^2$ to 250 $g/m^2$, and in other embodiments, from 125 $g/m^2$ to 200 $g/m^2$. Accordingly, the tint film 10 provides the coated release liner 16 with light contact (i.e. low tack) adhesive layer 18, which together improves film handling and reduces installation time by the installer, while the reduced static charge avoids the attraction of airborne and surface containments onto the adhesive 14.

D. Tint Layer:

1. Printing Techniques:

Tint layer 18 may be added to surface 13B of transparent layer 12 by a variety of techniques discussed herein. For example, tint layer 18 may be printed on transparent layer 12. In one or more other embodiments, tint layer 18 may be added to the surface 13B of the transparent layer 12 by thermal lamination or cold lamination. In certain embodiments, a digital printer may be utilized. Such printers may utilize one or more printing technologies, including, but not limited to ink jet printing, solvent printing, eco-friendly solvent printing, latex printing, UV (ultra-violet) printing, and the like. Other suitable methods of applying tint layer 18 to surface 13B of transparent layer 12 include, but are not limited to: dry bond lamination, wet bond lamination, gravure coating, extrusion lamination, solvent-less lamination, UV curing, extrusion slot die coating, slot die coating, curtain coating, reverse roll coating, and the like.

Figure 3:
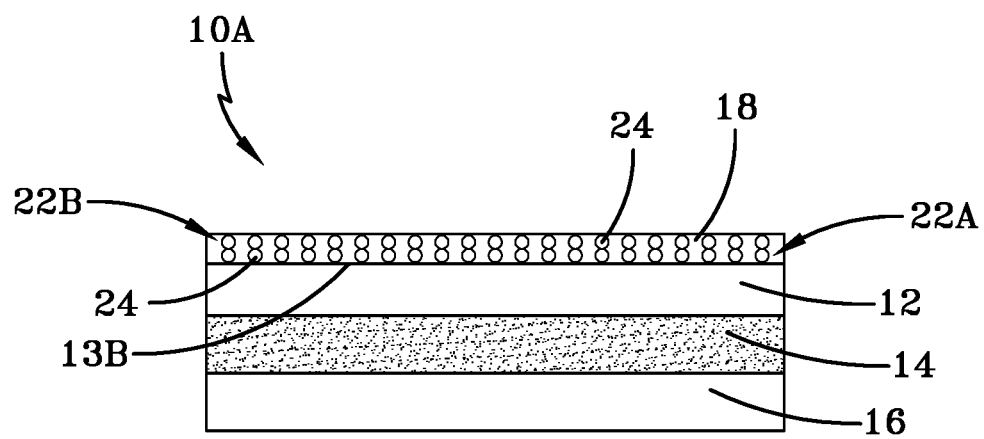
FIG. 3 is a cross-sectional view of the tint film having a tint layer formed by a double-strike printing method in accordance with the various embodiments disclosed herein.
Figure 4:
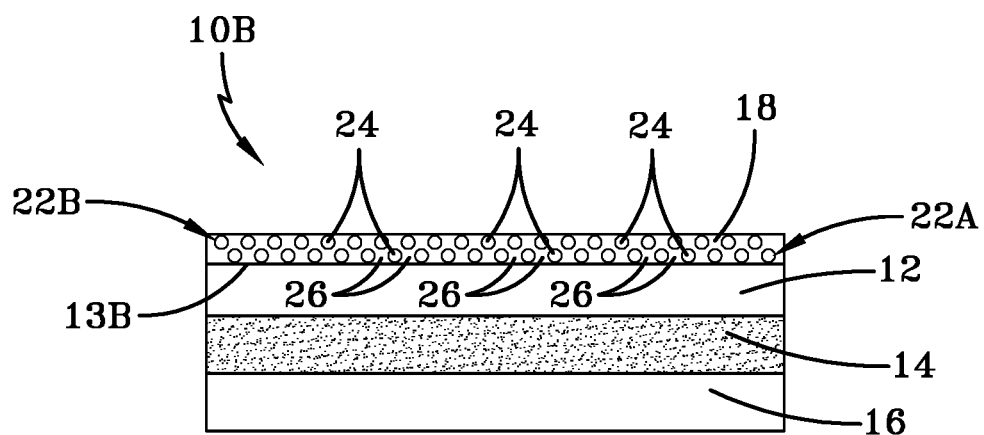
FIG. 4 is a cross-sectional view of the tint film having a tint layer formed by a double-strike offset printing method in accordance with the various embodiments disclosed herein.
Figure 5:
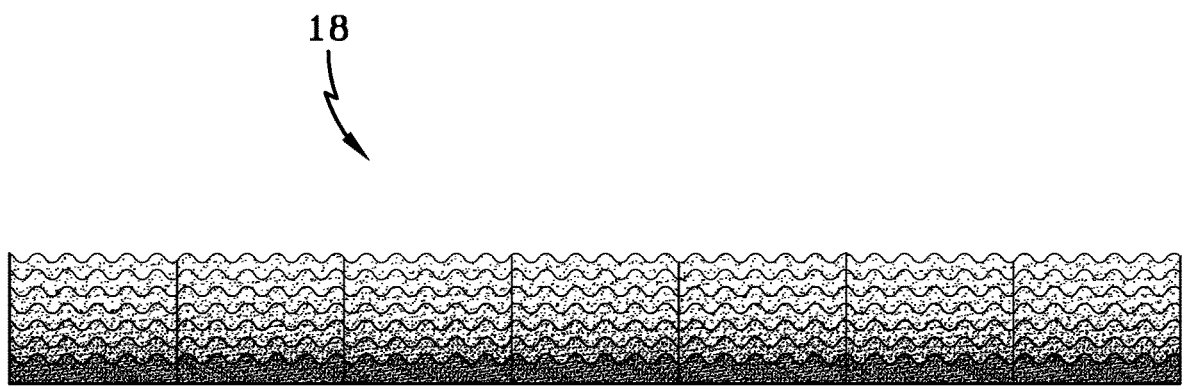
FIG. 5 is a view showing successive layers of printed ink formed in accordance with an interweave printing process that does not produce banding in accordance with the various embodiments disclosed herein.
Figure 6:
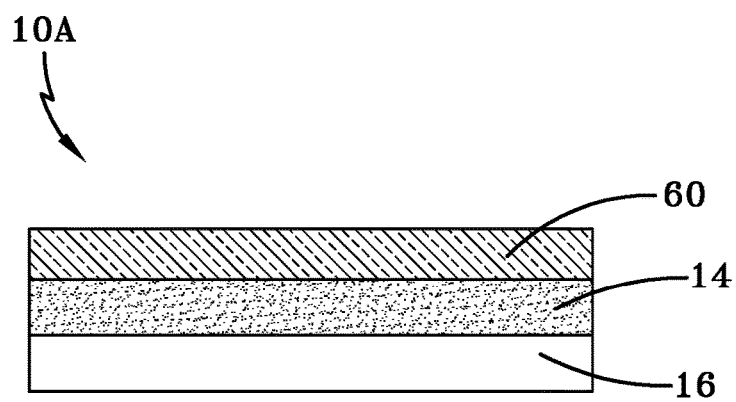
FIG. 6 is a cross-sectional view of the tint film formed by a casting process, whereby the tint layer is a composite tint layer formed by the combination of transparent material and tinting material in accordance with the various embodiments disclosed herein.
Figure 7:
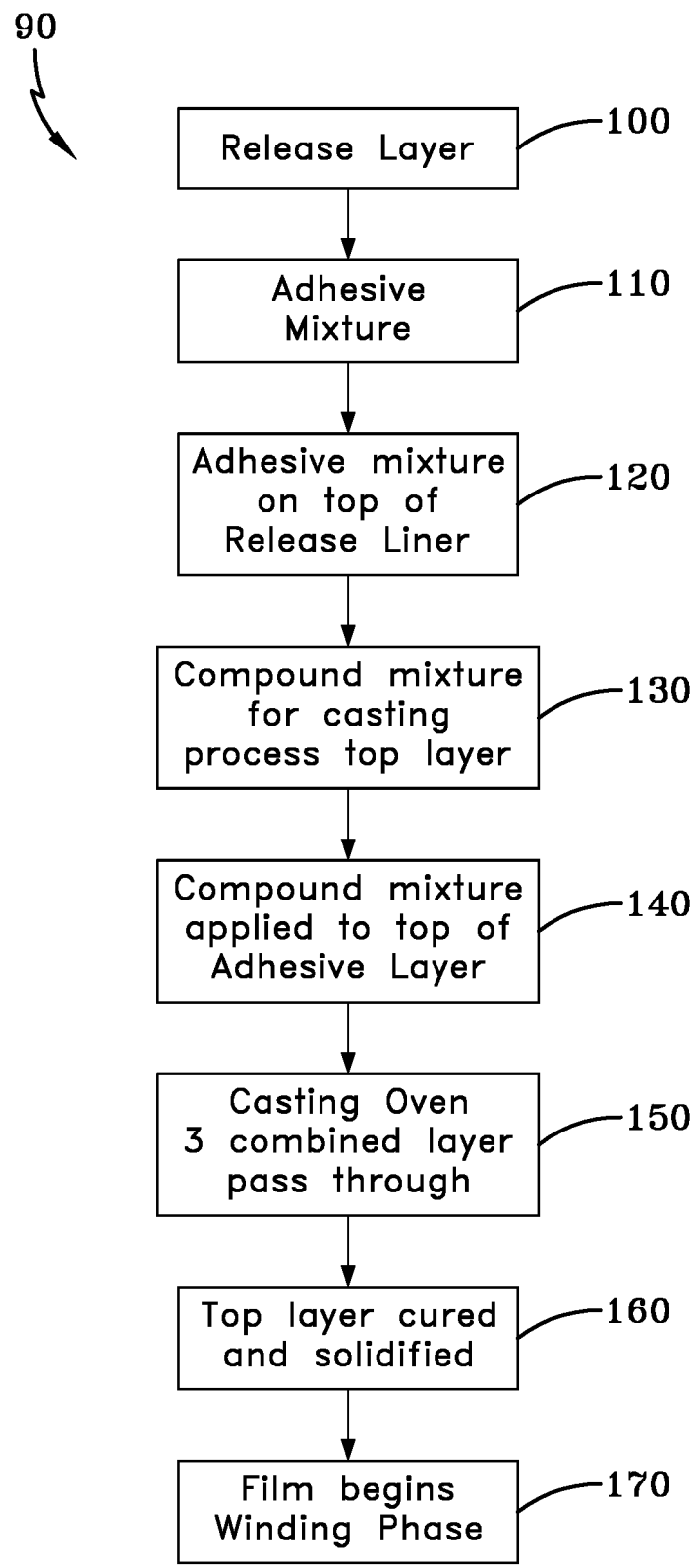
FIG. 7 is a flow diagram showing the method steps for forming the casted tint film shown in FIG. 6 in accordance with the various embodiments disclosed herein.
Figure 8:
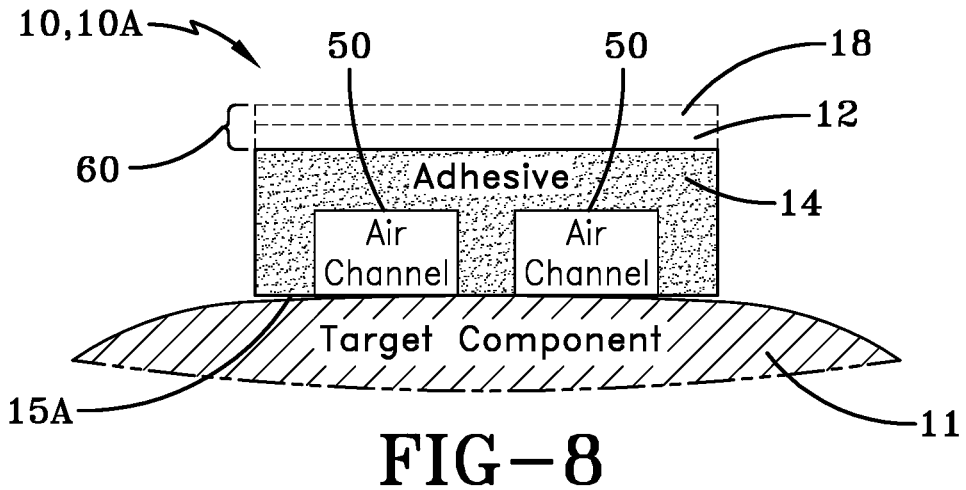
FIG. 8 is a cross-sectional view of the tint film showing air channels after the release liner has been removed and applied to the target component, such as a vehicle headlight lens, in accordance with the various embodiments disclosed herein.
Figure 9:
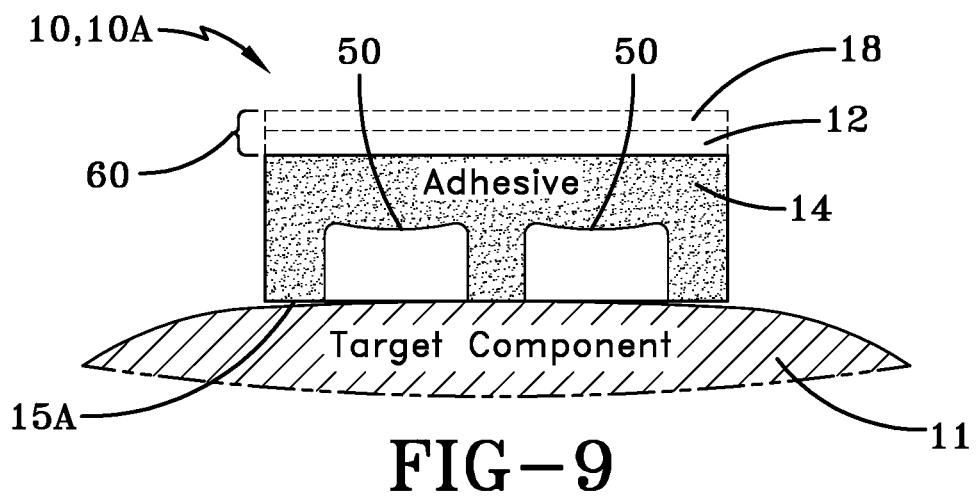
FIG. 9 is another cross-sectional view of the tint film based on FIG. 8, showing the degradation of the air channels in accordance with the various embodiments disclosed herein.
Figure 10:
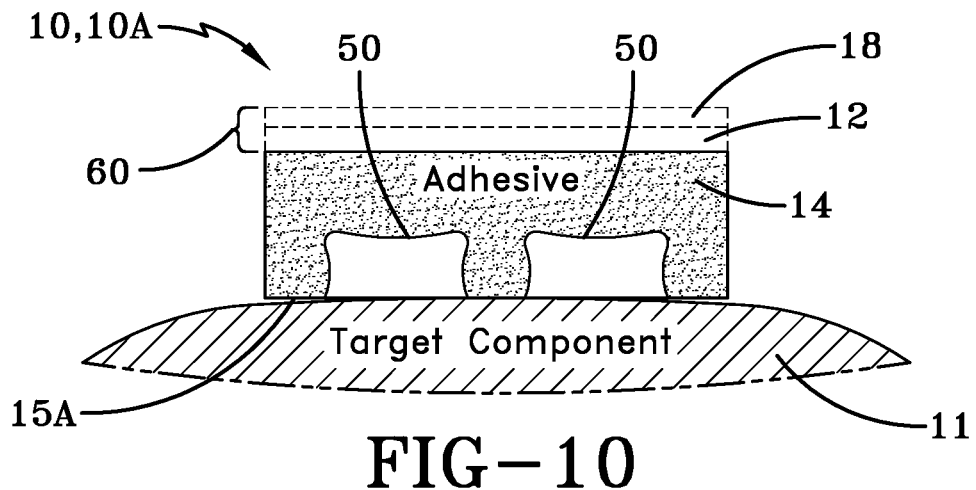
FIG. 10 is another cross-sectional view of the tint film based on FIG. 8, showing the increased degradation of the air channels in accordance with the various embodiments disclosed herein.
Figure 11:
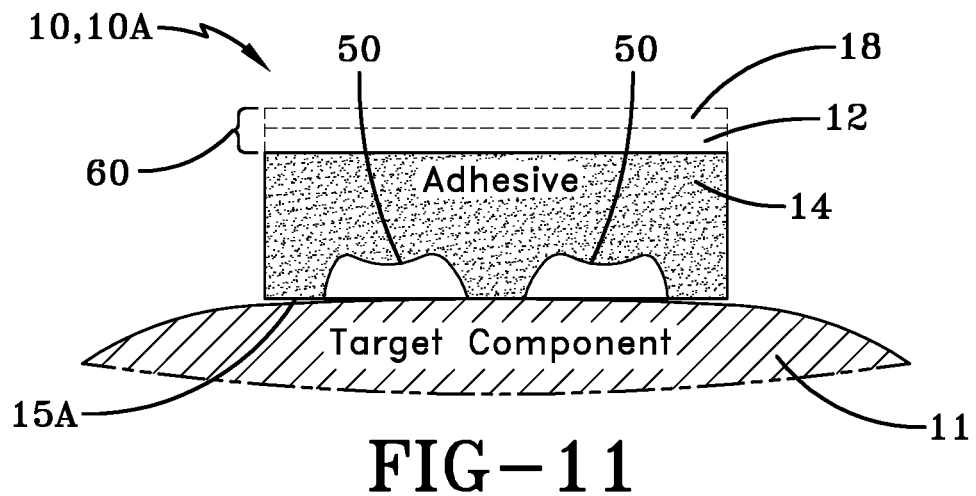
FIG. 11 is another cross-sectional view of the tint film based on FIG. 8, showing the further degradation of the air channels in accordance with the various embodiments disclosed herein.
Figure 12:
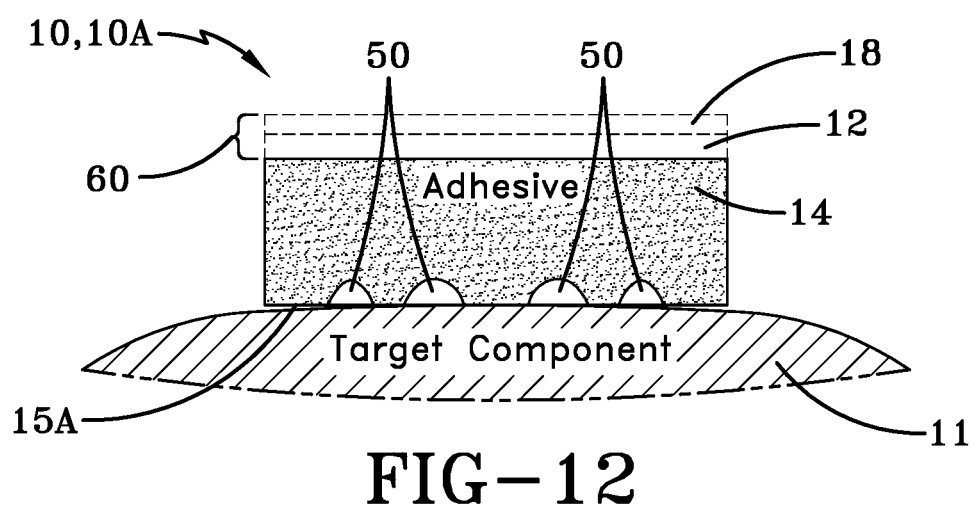
FIG. 12 is another cross-sectional view of the tint film based on FIG. 8, showing the nearly full degradation of the air channels in accordance with the various embodiments disclosed herein.

A printer may form tint layer 18 on transparent layer 12 by applying a composition, such as an ink composition, on transparent layer 12 to form tint layer 18. This application of the composition may be achieved by applying the composition from inkjet printing nozzles of a print head, which may utilize thermal, piezoelectric or continuous inkjet printing techniques for example. Tint layer 18 may comprise any indicia, such as a pattern or design, made by individual droplets of applied ink.

a. Double-Strike Printing:

One printing technique for forming the tint layer 18 is a double-strike printing process, which may be utilized with the inkjet printer. Double-strike printing controls the inkjet print head to print two fully overlapping, or substantially overlapping indicia, one over the other. That is, the print head performs two passes, whereby a first layer 22A of ink droplets 24 are placed on the surface 13B of the film 10 and then a second layer 22B of ink droplets 24 are disposed directly on the first layer 22A of ink droplets 24, so as to be axially aligned as shown in FIG. 3. In the case of both layers, they are applied so that the droplets 24 have the same configuration, such as a grid, an array, or any other random or predetermined pattern. It should be appreciated that while two layers of ink droplets are described, a plurality of printed layers exceeding two may be utilized.

b. Offset Double Strike Printing:

Another printing technique utilized to form the tint layer 18 is an offset horizontal printing process. Offset printing utilizes the double-strike printing technique previously discussed but is configured such that the first layer 22A of ink droplets 24 includes spaces or gaps 26 between adjacent droplets, as shown in FIG. 4, so that the lateral position between the droplets 24 printed on the surface 13B of the film 10 and the second layer 22B of droplets 24 printed upon the first layer 22A of droplets 24 are offset by a predetermined distance from each other. Accordingly, the droplets 24 of the second layer 22B are positioned on, over, upon, or adjacent to the gaps 26 formed in the first layer 22A.

c. Interweave Printing:

Another printing technique for forming the tint layer 18 is referred to as an interweave or non-banding printing technique. During interweave printing, the print head applies the ink droplets in many layers in a partially overlapping pattern to prevent banding of the image produced by adjacent passes of a print head. In other words, adjacent or partially overlapping layers of ink do not produce visually noticeable bands or discontinuities in the appearance of the image that is produced by the print head, which is unwanted. This series of partially overlapping layers/segments of the printed image serves to eliminate banding, thereby creating exceptional color quality and fidelity. Such printing technique provides increased accuracy and consistency of ink dot/drop size and release during printing, thereby improving the desired tint and/or translucent appearance. In one embodiment, the tint layer 18 may be formed utilizing a non-banding printing method, such as that provided by Mutoh Industries Ltd., disclosed in U.S. Pat. No. 8,233,188, which is incorporated herein by reference. An example of a tint layer 18 formed using the non-banding printing technique is shown in FIG. 5.

d. Cast Tint Film:

In another technique, a cast tint film 10A may be formed, whereby the material forming the transparent layer 12 and the material forming tint layer are combined together to form a composite layer 60, as shown in FIG. 6. A casting process referred to by the numeral 90 is utilized to form the cast film 10, as shown in FIG. 7. Initially, at step 100 of the process 90, the release liner or layer 16 is provided, whereupon the release liner 16 is treated by an adhesive mixture to form the adhesive layer 14 at step 110. As a result of this process, the adhesive layer 14 is applied to the release liner 16, as indicated at step 120. Continuing, at step 130, the release liner 16 and adhesive layer 14 are then treated at step 130 with a compound mixture of the material used to form the composite layer 60, which combines the properties of layers 12 and 18 into a single layer. In particular, the material used to form the transparent material in the cast method include cast polyvinylchloride (PVC) example. With regard to the materials used to tint the composite layer 60, they may include one or more pigments, dyes, or combinations thereof. It should be appreciated that the pigments and dyes may be of any desired color or combination of colors to achieve the desired ratio thereof to form any desired color, shade, or tint. As a result, a composite tint layer 60 is formed as a combination of the transparent material and the tint material, as indicated at step 140. After the composite tint layer 60 is applied to the adhesive layer 14, it is combined together with release liner 16 to form the resultant film 10A, which is treated with heat in a casting oven, as indicated at step 150. It should be appreciated that at step 150 of the casting process 90, the composite layer 60 is heat treated. This heating step may be at a temperature of from 200° F. to 600° F., and in other embodiments, from 400° F. to 500° F. In some embodiments, this heating step may be characterized by the distance the composite layer 60 travels while heated, which, in some cases, this distance may be from 10 ft. to 1000 ft., and in other embodiments, from 25 ft. to 250 ft. Next, at step 160, the film 10A is heat treated, whereupon the composite tint layer 60 is cured and solidified into a finished film. Finally, the finished cured film 10A may be wound up onto a spool for subsequent transport, as indicated at step 170.

Thus, in the case of the film 10A, the composite layer 60 incorporates both the tint material and the transparent material, and is at least partially light-transparent. It should be appreciated that the physical properties and materials of the transparent layer 12 and the tint layer 18 discussed herein are equally applicable to that of the composite tint layer 60.

Thus, in some embodiments, such as that in sections D.1.a., D.1.b., and D.1.c., the transparent layer 12, the adhesive layer 14, and the release layer 16 may be first formed, and then the tint layer 18 is added by printing or other application technique onto the transparent layer 12. In other embodiments, such as that in section D.1.d., materials used to form the tint are added to the materials used to form transparent layer 12 to form the composite layer 60 before the composite layer 60 is added to the adhesive layer 14 and the release liner 16. It should also be appreciated that the tint layer 18 and the composite layer 60 perform a light tinting/attenuation function, and are at least partially transparent to light.

2. Printing Ink:

The printing ink or printing material used to print the tint layer 18 may be any suitable material, including but not limited to: one or more of inks, polyesters, plastisols, organosols, dyes, pigments, dispersants, resins, stabilizers, humectants, wetting agents, amine derivatives, biocides, bacteristats, and combinations thereof. In some embodiments, inks include, but are not limited to: toluene-free, esterified-type polyurethane inks, generally known as 77K from EPSON, Inc.

In certain embodiments, the material used to form tint layer 18 may be characterized as a plasticizer paste dispersion. Other exemplary materials used to form tint layer 18 include UV-curable inks that are cured using a UV-LED (ultraviolet light emitting diode) output source. UV (ultraviolet)-curable inks generally include one or more monomers, oligomers, pigments, and photoinitiators. A representative UV-curable ink is available as UV LUH INK and US 11 INK from MUTOH. As generally known in the art, photoinitiators and pigments may be used in UV-LED formulations in order to match a desired spectral output of an LED lamp. The use of UV-curable inks may contain up to 50% monomers and oligomers that are naturally derived from renewable resources, such as plants and biomass. These may inks contain less than 0.08% VOCs (volatile organic compounds) and may not contain heavy metals, such as antimony, arsenic, cadmium, chromium, lead, mercury and selenium.

II. Color Properties of Tint Layer:

It should be appreciated that the printing material or inks utilized may be any desired color. For example, colors such as red (R), green (G), and blue (B) may be utilized in any desired ratio to form any desired color, shade, or tint; or, alternatively, cyan (C), magenta (M), yellow (Y), and black (K) may be utilized in any desired ratio to form any desired color, shade, or tint. However, any other colors and manner for combining them may be utilized. It should be appreciated that different layers 22A and 22B of the tint layer 18 may each be different colors.

In one or more embodiments, tint layer 18 may be a color tint, which may be referred to as a smoked tint. The color tint may be any suitable color, and in certain embodiments, the tint color is black.

In these or other embodiments, tint layer 18 may include a shaped or a textured design, which may also be referred to as a translucent visual effect. Exemplary shaped designs include, but are not limited to, carbon fibers, sparkle, brushed metal, honeycomb, and spider webs.

In one or more embodiments, tint layer 18 may include a finish selected from gloss, matte, satin finish, or combinations thereof.

III. Tint Performance:

Tint layer 18 may be characterized by its visible light transmittance (VLT), which is a performance feature of the tint layer 18. In one or more embodiments, tint layer 18 is characterized as a tint having a VLT from about 2% to about 20%. In one or more embodiments, tint layer 18 is characterized as a tint having a VLT from about 20% to about 50%. In one or more embodiments, tint layer 18 is characterized as a tint having a VLT from about 50% to about 99%.

In other embodiments, the VLT of tint layer 18 may be in range of from about 5% to about 90%; in other embodiments, from about 15% to about 55%; and in other embodiments, about 80%. Advantageously, tint layer 18 may provide a shaded appearance, while still allowing light to be transmitted through tint layer 18. Thus, the tint layer 12 may be at least partially or fully transparent.

VLT, or translucency, may be based on the ability of a pigment or dye of the ink used to form the tint layer 18 to scatter light. This may be based on the pigment or dye having sufficiently small particles, as smaller particles generally scatter light more efficiently.

The thickness of tint layer 18 may be in a range of from about 0.5 mil to about 8 mil, in other embodiments, from about 1 mil to about 7 mil, and in other embodiments, from about 2 mil to about 5 mil.

IV. Additional Laminated Protective Layers:

Though not shown in the FIGS., in certain embodiments, tint films 10 and 10A may include one or more protective layers disposed upon the tint layers 18,60. Suitable materials for the protective layer include, but are not limited to: ceramics, such as silicon oxide, silicon dioxide, and other oxide ceramics based on silica; PTFE; TFE; PAVE; PFA; PMVE; and ETFE. Where utilized, such protective layers may serve to protect the tint layer/composite layer 18,60 against environmental hazards, such as UV (ultra-violet) radiation from the sun, and physical damage from debris that is encountered when the vehicle utilizing this tint film 10 is driven, as well as stain resistance, and/or easier cleaning and maintenance to the tint film 10. In some embodiments, the thickness of a protective layer may be in a range of from 0.25 mil to 10 mil, and in other embodiments, from 1 mil to 5 mil.

V. Method of Application of Tint Film:

One or more embodiments of the tint film 10 relate to a method of applying the tint film 10 to the target component 11, such as a headlight lens. With reference to FIG. 2, this may include a first step of providing the tint film 10 having a transparent layer 12 with a tint layer 18, an adhesive layer 14, and a release liner 16 on the adhesive layer 14. In some embodiments, tint film 10 may be pre-formed in the shape of the target component 11, or tint film 10 may be larger than the target component 11 and then cut to the desired size needed to fit the target component 11.

Next, the target component 11, such as a vehicle headlight, may be cleaned with a suitable cleaning material. Once the target component 11 is in suitable condition to receive adhesive layer 14, release liner 16 may be removed from the adhesive layer 14 so that only the target tint film 22 remains. The surface 15A of the adhesive layer 14 may then be applied to the cleaned target component 11. Advantageously, in one or more embodiments, the adhesive layer 14 may be dry applied, that is, devoid of using a water-based solution between adhesive layer 14 and the cleaned target component 11. If necessary, a squeegee may be utilized to remove air bubbles from between the adhesive layer 14 and the cleaned target component 11.

As discussed herein, the adhesive layer 14 and air channels 50 allow sufficient slideability to maneuver the applicable target tint film 22 into place without the need to lift the film 10,10A to remove the film from the target component 11. When the target tint film 22 is in the desired position, the adhesive layer 14 then bonds to the target component 11, as shown in FIGS. 8-12. In certain embodiments, the adhesive layer 14 may bond to the target component 11 by the application of physical pressure to the film 10,10A. In these or other embodiments, the adhesive layer 14 may be further heated to facilitate adhesion. For example, the film 10,10A may be heated to a temperature from about 160° F. to 230° F., and in other embodiments, from 180° F. to 220° F. The time for this heating step may be any suitable time in order to achieve the necessary temperature.

In certain embodiments, particularly those where the transparent layer 12 is made from thermoplastic urethane, a method of applying the target tint film 22 to the target component 11 may be devoid of a step of post heating. In these embodiments, the adhesion may be made permanent by using a wet solution working from inner section first to the outer sections then applying firm even pressure with 50% overlapping strokes to push the solution out from under the film to the edge.

The method of applying the films 10, 10A to the target component 11 facilitates the installation process over existing methods of applying a tint film, particularly those existing methods utilizing tack adhesives having a tack greater than 300-400 gm/cm². Embodiments of the tint film 10,10A allow for reduced installation time compared to existing methods, as well as the ease of conforming the film 10,10A to the shape and contour of the target component 11. In certain embodiments, the installation time may be reduced by 50%, or approximate thereto, compared to existing films. In certain embodiments, the installation of target tint film 10,10A may be accomplished by a single installer, as compared to existing films requiring two installers. Various embodiments disclosed herein may be characterized by reduced static and dust contamination compared to existing methods. Embodiments of the tint film 10, 10A may achieve longevity of the tint film of about twice as long, or more, as existing films.

VI. Self-Healing Properties of the Transparent Layer:

In certain embodiments, cast film 10A may have self-healing properties that allow the material of composite tint layer 60 to "flow" to repair damage it sustains. It should be appreciated that self-healing material may utilize encapsulation techniques that include in situ polymerization, interfacial polymerization pickering emulsion, microemulsion polymerization, solvent evaporation/extraction, or sol-gel reaction, and combinations thereof. Materials used for self-healing also include microencapsulation of a reactive anime in an epoxy matrix, intercalated nanoclays, and carbon nanotube bundles, polyureas, polyurethanes melamine-formaldehyde and urea-formaldehyde, and the like. Other variations may include aqueous metal oxide suspensions, self-healing agents based on epoxy functionalized alkyd polymers, co-crosslinking agents/enhancers, adhesion promoters, and the like. An additional layer may be added to the films 10,10A with memory polymers woven into a ceramic backbone.

The self-healing materials are generally capable of repairing the damage via a temporary increase in mobility leading to a "re-flow" of the material forming the composite tint layer 60 within the damaged area. The self-healing effect may be based on specific molecular structures and performance of the materials that enable damage to be healed under a particular stimulation followed by the restoration of the chemical or physical bond strength of the materials.

The damage requiring repair by self-healing might be caused by displacement (i.e. indentation) of a portion of the composite layer 60, such as by a partial or complete fracture of composite layer 60, by a foreign object. The stimulation allowing the ability to self-heal or flow may include application of thermal energy, or heat, which may be applied to the damaged film by, for example, the sun, warm water, or a heat gun. The thermal energy warms the composite layer 60, which allows it to naturally return to its lowest flattest energy state, thus bonding a partial or complete fracture back together and thereby repairing the damage displacement. In one or more embodiments, composite layer 60 may include one or more compositional components to assist with the self-healing properties. These may include one or more of releasable healing agents, reversible cross linkers, embedded microcapsules, and catalysts.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A method of manufacturing a tint film comprising:
providing a film including:
- an at least partially transparent layer having a first surface and a second surface;
- an adhesive layer in adhesive contact with the second surface of the at least partially transparent layer, the adhesive layer having a tack of less than 400 gm/cm$^2$; and
- a release liner in releasable adhesive contact with the adhesive layer on a surface of the adhesive layer opposite the transparent layer; and
- printing a plurality of ink droplets to form a tint layer on the first surface of the at least partially transparent layer, wherein a portion of the plurality of ink droplets at least partially overlap another portion of the plurality of ink droplets.

2. The method of claim 1, wherein the at least partially transparent layer is a polymeric material.

3. The method of claim 2, wherein the polymeric material is polyvinylchloride (PVC).

4. The method of claim 1, wherein the adhesive comprises solvent acrylic, solvent polyacrylate, acrylic polymers, emulsion polymers, polyvinyl acetate, or ethylene vinyl acetate.

5. The method of claim 1, wherein the adhesive layer is a dry adhesive.

6. The method of claim 5, wherein the adhesive layer is a pressure sensitive adhesive.

7. The method of claim 1, wherein the release liner is made of a polyethylene-coated paper having a silicone coating, the release liner having protrusions extending into the adhesive layer.

8. The method of claim 7, further comprising:
removing the release liner to form an interconnected network of channels in the adhesive layer.

9. The method of claim 1, wherein the at least partially transparent layer comprises thermoplastic urethan (TPU) or cast polyvinylchloride (PVC).

10. A method of manufacturing a tint film comprising:
providing a film including:
- an at least partially transparent layer having a first surface and a second surface;
- an adhesive layer in adhesive contact with the second surface of the at least partially transparent layer, the adhesive layer having a tack of less than 400 gm/cm$^2$; and
- a release liner in releasable adhesive contact with the adhesive layer on a surface of the adhesive layer opposite the transparent layer; and
- printing a plurality of ink droplets to form a tint layer on the first surface of the at least partially transparent layer, wherein a portion of the plurality of ink droplets are spaced apart by gaps, and wherein another portion of the plurality of ink droplets are positioned to at least partially extend over the gaps.

11. A method of manufacturing a tint film comprising:
providing a film including:
- an at least partially transparent layer having a first surface and a second surface;
- an adhesive layer in adhesive contact with the second surface of the at least partially transparent layer, the adhesive layer having a tack of less than 400 gm/cm$^2$; and
- a release liner in releasable adhesive contact with the adhesive layer on a surface of the adhesive layer opposite the transparent layer; and applying a tint layer on the first surface of the at least partially transparent layer, wherein the tint layer is at least partially light transparent, wherein the step of applying is a step of printing, and wherein the step of printing is double-strike printing including:

forming a first layer of ink droplets; and forming a second layer of ink droplets directly upon the ink droplets of the first layer.

12. A method of manufacturing a tint film comprising:
providing a film including:
- an at least partially transparent layer having a first surface and a second surface;
- an adhesive layer in adhesive contact with the second surface of the at least partially transparent layer, the adhesive layer having a tack of less than 400 gm/cm$^2$; and
- a release liner in releasable adhesive contact with the adhesive layer on a surface of the adhesive layer opposite the transparent layer; and applying a tint layer on the first surface of the at least partially transparent layer, wherein the tint layer is at least partially light transparent, wherein the step of applying is a step of printing, and wherein the step of printing is double-strike offset printing, including:

forming a first layer of ink droplets, such that adjacent ink droplets are separated by a gap; and forming a second layer of ink droplets over the gaps of the first layer.

* * * * *